United States Patent
Sasso et al.

(10) Patent No.: US 9,309,142 B2
(45) Date of Patent: Apr. 12, 2016

(54) MOULD-SUPPORTING SYSTEM FOR A MACHINE FOR FORMING HOLLOW GLASSWARE

(71) Applicant: BDF HOLDINGS S.p.A., Vicenza (VI) (IT)

(72) Inventors: Daniele Sasso, Tesido di Monguelfo (IT); Marco Gennari, Vicenza (IT)

(73) Assignee: BDF HOLDINGS S.p.A., Vicenza (IT)

( * ) Notice: Subject to any disclaimer, the term of this patent is extended or adjusted under 35 U.S.C. 154(b) by 43 days.

(21) Appl. No.: 14/486,841

(22) Filed: Sep. 15, 2014

(65) Prior Publication Data

US 2015/0075226 A1 Mar. 19, 2015

(30) Foreign Application Priority Data

Sep. 13, 2013 (EP) .................................... 13184247

(51) Int. Cl.
*C03B 11/16* (2006.01)
*C03B 9/40* (2006.01)
*C03B 9/353* (2006.01)

(52) U.S. Cl.
CPC ............... *C03B 11/16* (2013.01); *C03B 9/3537* (2013.01); *C03B 9/40* (2013.01); *C03B 2215/50* (2013.01); *C03B 2215/70* (2013.01)

(58) Field of Classification Search
CPC ............................... C03B 9/3537; C03B 9/353
See application file for complete search history.

(56) References Cited

U.S. PATENT DOCUMENTS

| | | | | |
|---|---|---|---|---|
| 3,251,673 A * | 5/1966 | Brymer, Jr. | ............ | C03B 9/3537 65/323 |
| 4,009,018 A * | 2/1977 | Nebelung | ............. | C03B 9/3875 65/229 |
| 4,070,174 A | 1/1978 | Nebelung et al. | | |
| 4,576,624 A * | 3/1986 | Seidel | ........................ | C03B 9/28 65/240 |
| 4,770,687 A * | 9/1988 | Nebelung | ............. | C03B 9/3537 65/357 |
| 4,978,380 A * | 12/1990 | Nebelung | ............. | C03B 9/1932 249/167 |
| 5,252,114 A * | 10/1993 | Sidler | ................... | C03B 9/3537 65/229 |
| 5,275,638 A * | 1/1994 | Sidler | ................... | C03B 9/3537 65/359 |
| 5,569,313 A * | 10/1996 | Meyer | ................... | C03B 9/3537 65/357 |
| 5,578,105 A * | 11/1996 | Meyer | ................... | C03B 9/3537 65/359 |
| 2015/0075225 A1 * | 3/2015 | Sasso | ........................ | C03B 9/40 65/361 |

FOREIGN PATENT DOCUMENTS

EP 0671365 A1 9/1995
IT 1 070 046 7/1976

OTHER PUBLICATIONS

European Search Report for corresponding European Patent Application No. 13184247.8 dated Mar. 24, 2014.

* cited by examiner

*Primary Examiner* — Jason L Lazorcik
(74) *Attorney, Agent, or Firm* — Heslin Rothenberg Farley & Mesiti P.C.; Victor A. Cardona, Esq.

(57) ABSTRACT

A mold-supporting system for a machine for forming hollow glassware, includes a supporting structure, a first carriage and a second carriage, which are slidably mounted respectively on a first bar and a second bar of the supporting structure, and carry, respectively, a first mold-carrier arm and a second mold-carrier arm. A mutual displacement of the first and second carriages between a position where they are set close to one another and a corresponding position where they are set apart is controlled. On one between the first and second carriages, means are provided for guiding the other between the first and second carriages during their mutual displacement.

14 Claims, 7 Drawing Sheets

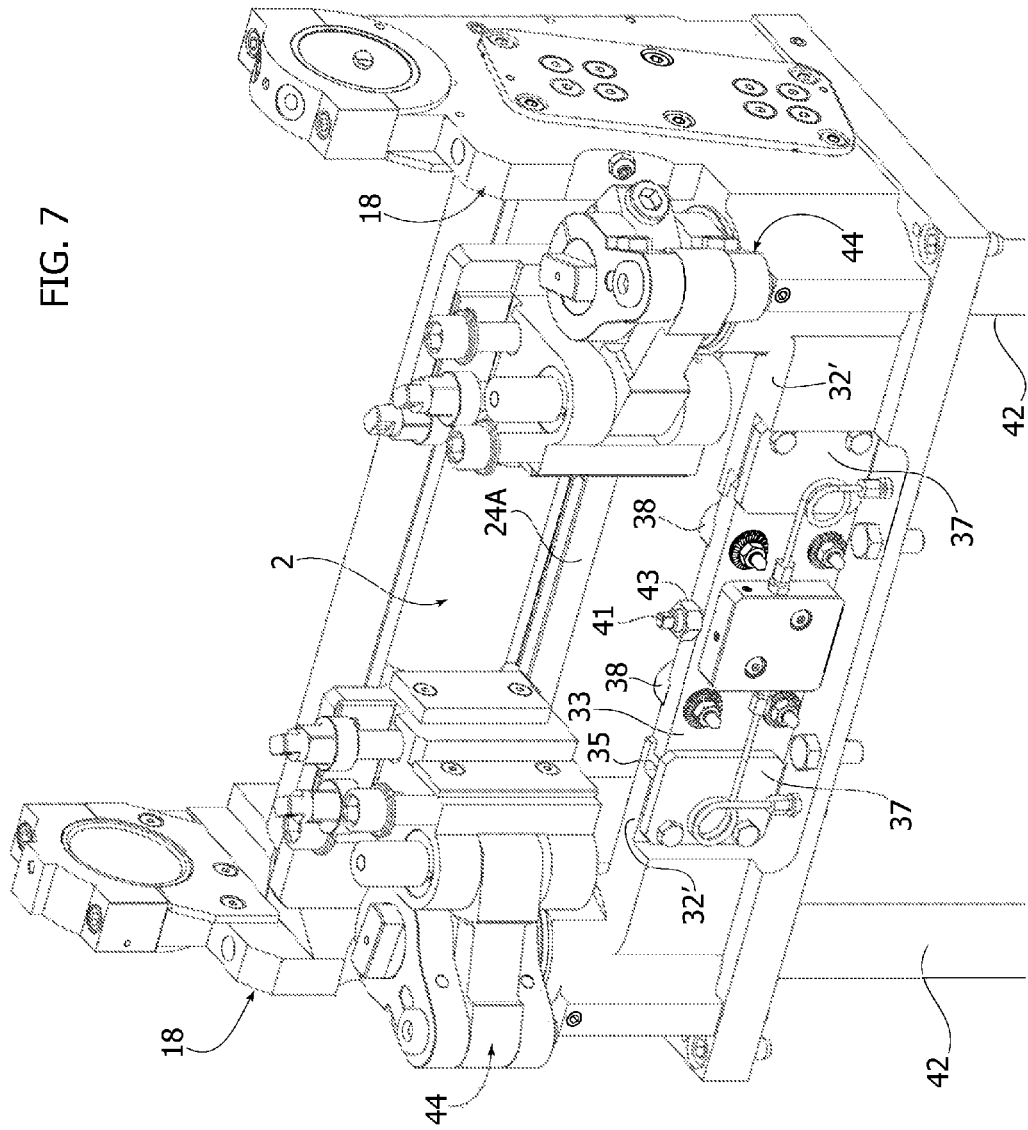

MOULD-SUPPORTING SYSTEM FOR A MACHINE FOR FORMING HOLLOW GLASSWARE

CROSS-REFERENCE TO RELATED APPLICATIONS

This application claims priority to European Patent Application No. 13184247.8 filed on Sep. 13, 2013, the entire disclosure of which is incorporated herein by reference in its entirety.

This application contains subject matter which is related to the subject matter of co-owned U.S. Ser. No. 14/486,748, filed concurrently herewith, entitled "MOULD-SUPPORTING SYSTEM FOR A MACHINE FOR FORMING HOLLOW GLASSWARE", the entire disclosure of which is incorporated herein by reference in its entirety.

BACKGROUND OF THE INVENTION

The present invention relates in general to the field of machines for forming hollow glassware. The invention regards, more in particular, a mould-supporting system for a machine of the type specified above. Still more in particular, the invention regards a mould-supporting system of the type comprising:

- a supporting structure;
- a first carriage and a second carriage, which are slidably mounted, respectively, on a first bar and a second bar of said supporting structure, and carry, respectively, a first mould-carrier arm and a second mould-carrier arm; and
- means for controlling mutual displacement of said first and second carriages between a position where said arms are set close to one another and a corresponding position where they are set apart.

A system of the type indicated above is, for example, described in the Italian patent No. IT 1 070 046 and in the European patent No. EP 0 671 365.

SUMMARY OF THE INVENTION

The object of the present invention is to provide a system of the type specified above that will be improved, in particular that will be able to guarantee, over time, a precise alignment, and that will present a structure that is simple and has small overall dimensions.

The object referred to above is achieved via a system presenting the characteristics indicated in the claims.

The claims form an integral part of the technical teaching provided herein in relation to the invention.

BRIEF DESCRIPTION OF THE DRAWINGS

Further characteristics and advantages of the invention will emerge clearly from the ensuing description with reference to the annexed drawings, which are provided purely by way of non-limiting example and in which:

FIG. 7 is a perspective view of a further embodiment of the system described herein.

DETAILED DESCRIPTION OF THE INVENTION

Figure 1:
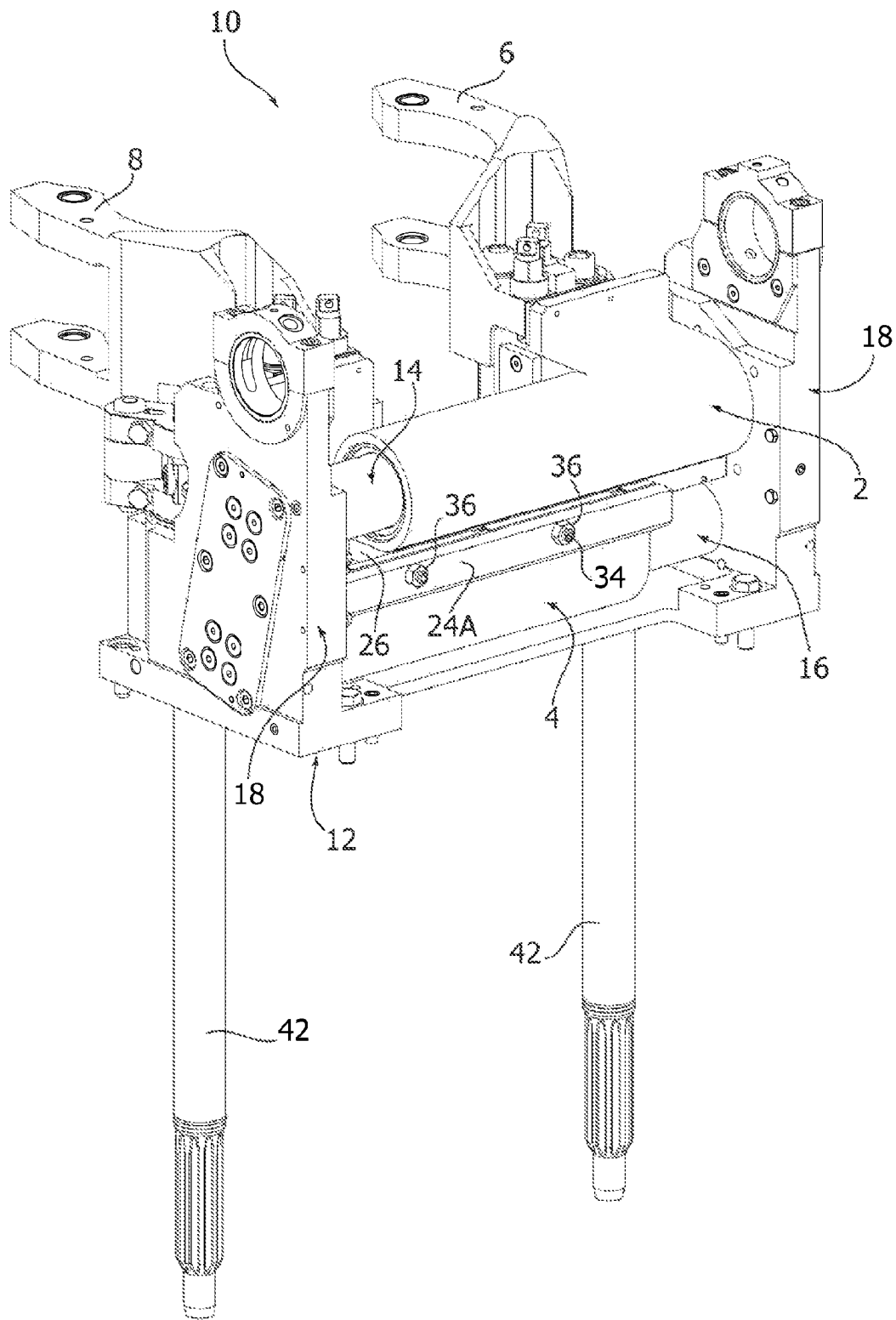
FIG. 1 is a rear perspective view of an embodiment of the system described herein.
Figure 2:
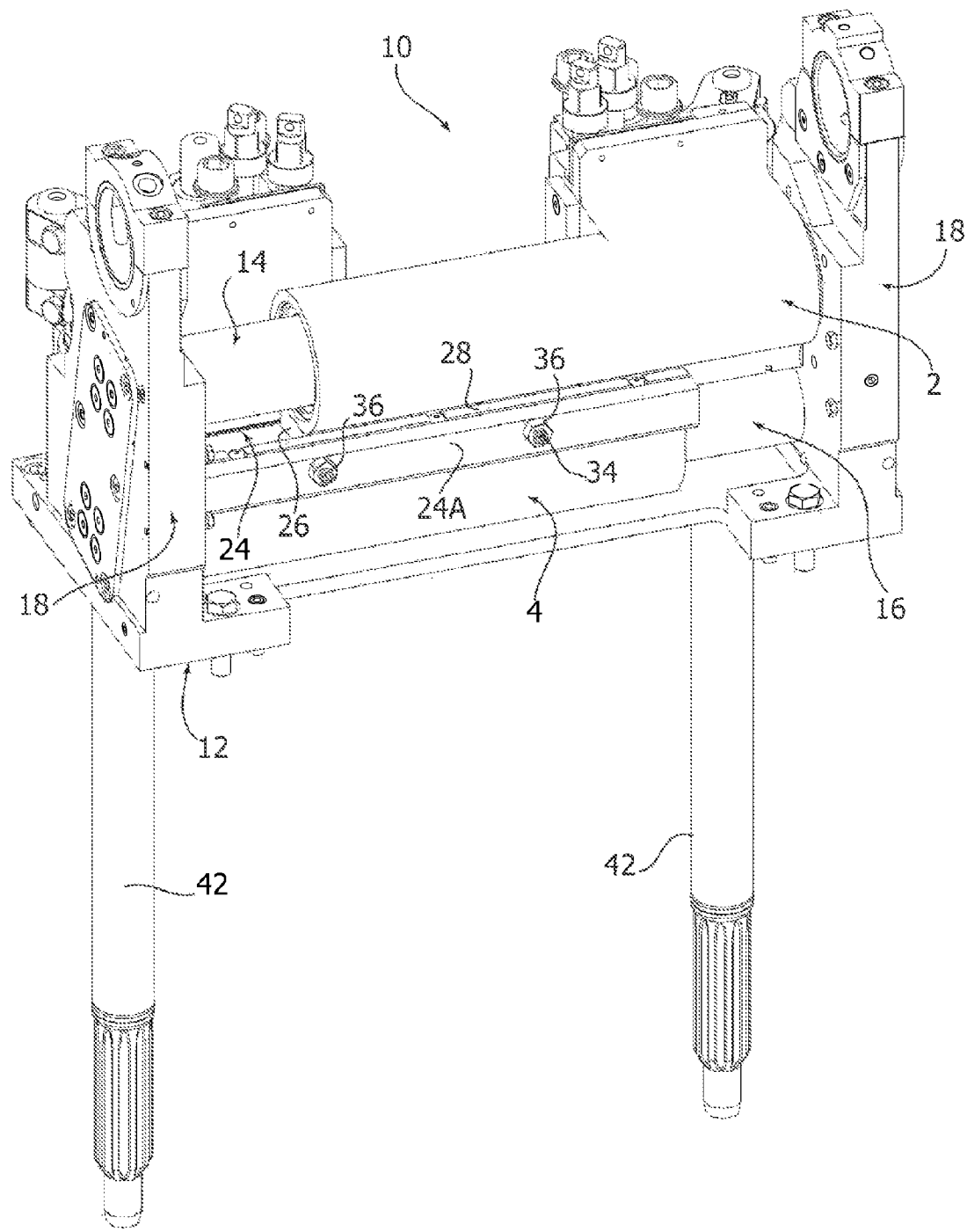
FIG. 2 is a rear perspective view, from a different angle, of the system of FIG. 1 in which the mould-carrier arms have been removed.
Figure 3:
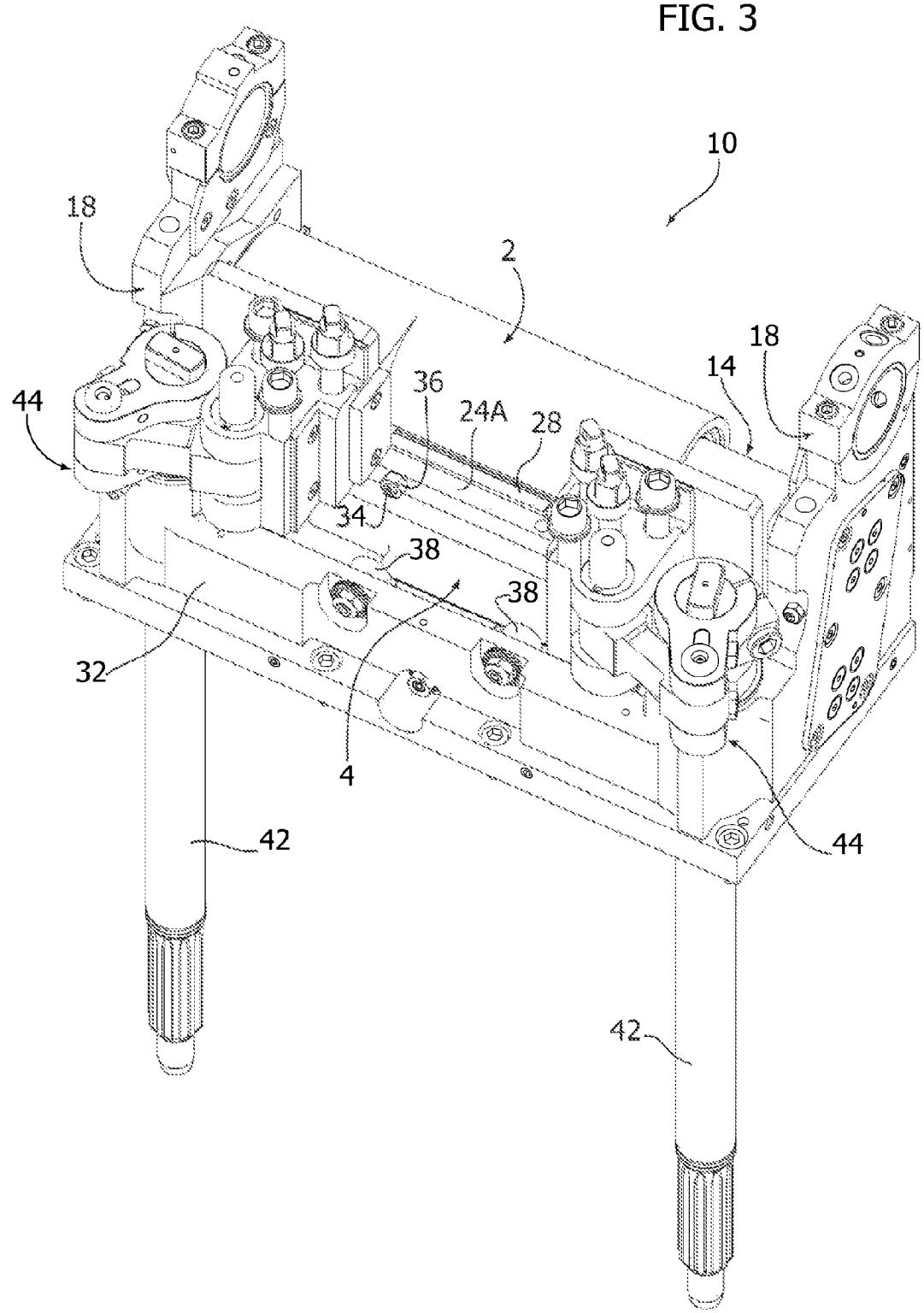
FIG. 3 is a front perspective view of the system of FIG. 2.
Figure 4:
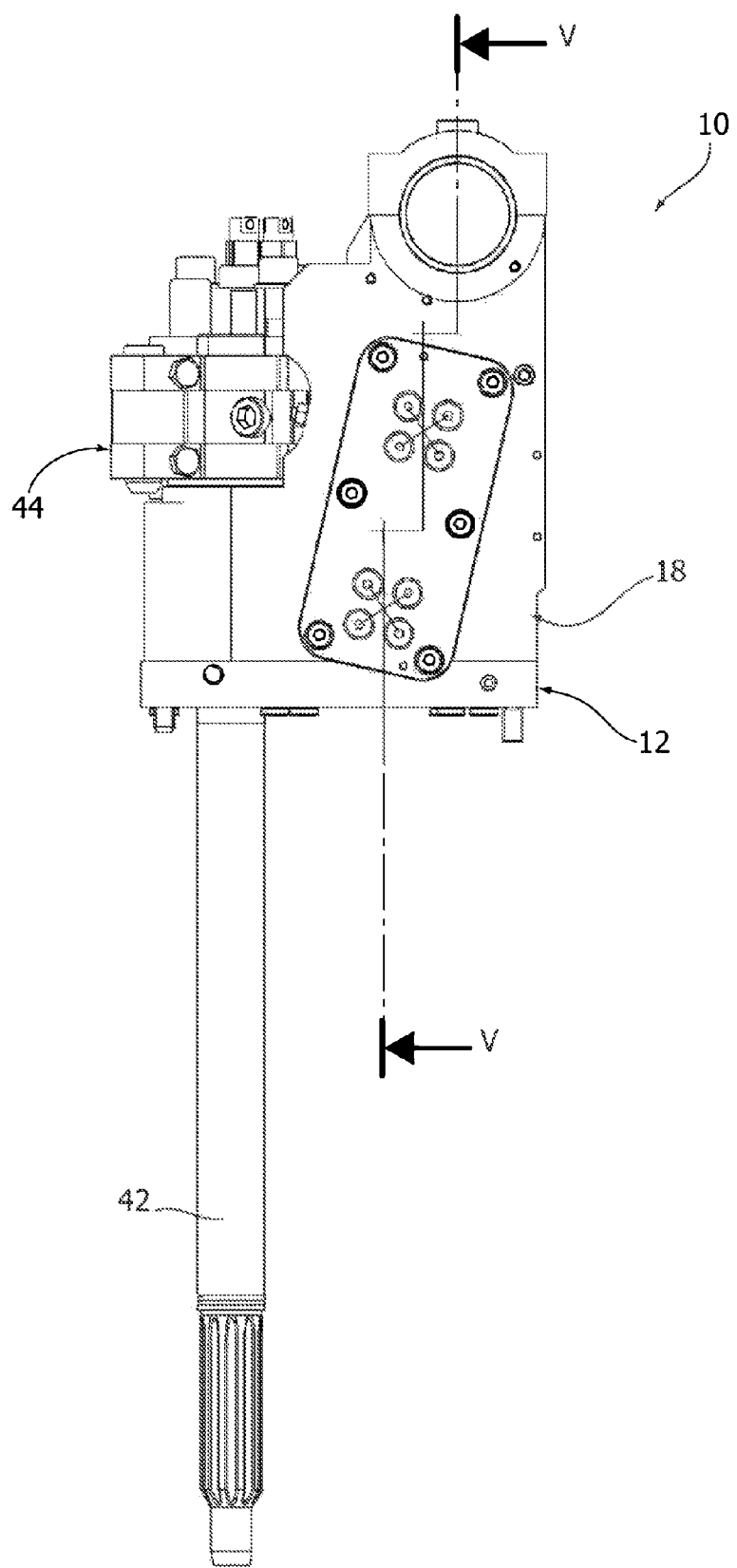
FIG. 4 is a view in lateral projection of the system of FIG. 2.

In the ensuing description various specific details are illustrated aimed at an in-depth understanding of the embodiments. The embodiment may be provided without one or more of the specific details, or with other methods, components, or materials, etc. In other cases, known structures, materials, or operations are not shown or described in detail so that various aspects of the embodiment will not be obscured.

The references used herein are only provided for convenience and hence do not define the sphere of protection or the scope of the embodiments.

With reference to the figures, designated as a whole by the reference number 10 is a mould-supporting system of a machine for forming hollow glassware. The system in question can be used for supporting both the blank moulds and the blow moulds of the forming machine. For the reasons that will be outlined in what follows, use of the above system is in any case particularly advantageous for supporting blow moulds.

In various embodiments, as in the one illustrated, the system 10 comprises a supporting structure 12, presenting a first sliding bar 14 and a second sliding bar 16, parallel to one another, slidably mounted on which are, respectively, a first carriage and a second carriage 2, 4. The carriages 2 and 4 carry the mould-carrier arms 6 and 8, connected thereto in a removable way via means of a known type (for example, fixing screws and alignment cams).

The system 10 comprises means for controlling mutual displacement of the carriages 2 and 4 between a position where they are set close to one another (not illustrated), and a corresponding position where they are set apart (visible in FIG. 1). As known, in the position where the carriages are set close to one another, the moulds of the arms 6 and 8 carried thereby are coupled together in a closed configuration, to constitute the mould cavity within which the hollow glassware is formed.

It should be noted that the aforesaid control means may be of any type already known in the technical field in question. In the embodiment illustrated in the figures, these means have, for each carriage, a shaft 42 with vertical axis, coupled, at its top ends, to a crank mechanism 44, connected to the carriage and designed to convert the motion of rotation of the shaft into a reciprocating rectilinear motion of the carriage.

In various embodiments, as in the one illustrated, the first carriage 4 has means for guiding movement of the carriage 2. Moreover, in various embodiments, as in the one illustrated, the supporting structure 12 has further means for guiding movement of the carriage 4. As will be seen in detail in what follows, the guide means in question are designed to determine the angular position of the two carriages, around the bars on which they are mounted so as to define specific inclinations of their mould-carrier arms suitable to provide proper alignment of the moulds of the machine. In particular, the carriages 2 and 4 engage the bars 14 and 16, being able to oscillate around these at least through a given angular range, and the guide means are configured for constraining them in a pre-set angular position. In various embodiments, as in the one illustrated, the guide means in question are moreover provided with means that are designed to enable adjustment of the above angular position of the carriages.

In view of what has been described above, and as will be seen in detail, the two bars 14 and 16 have the main function of supporting the weight and inertia of the carriages 2 and 4, whilst the orientation and inclination of these, and of the mould-carrier arms mounted thereon, are determined by engagement by the aforesaid guide means.

Figure 5:
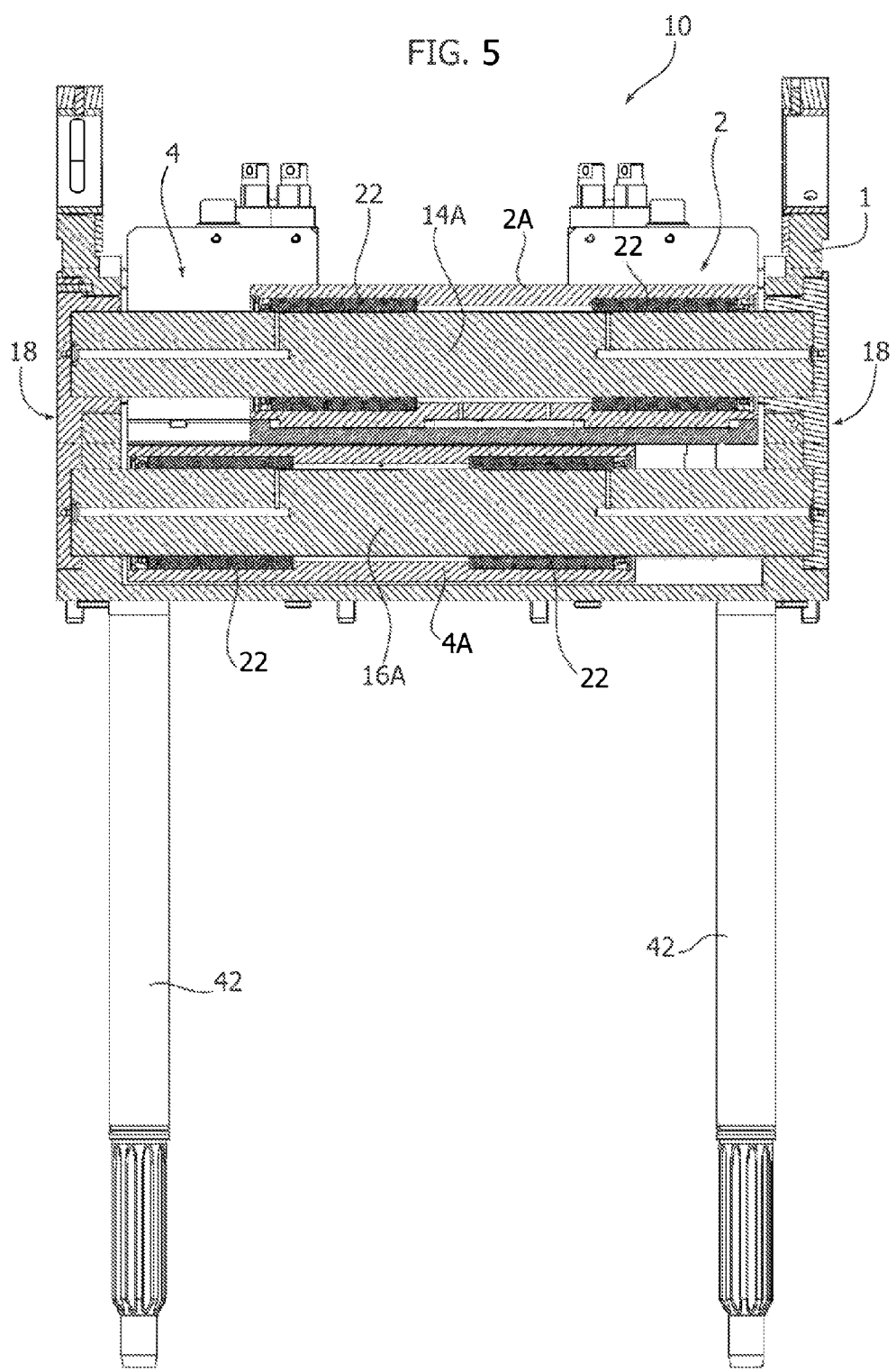
FIG. 5 is a cross-sectional view according to the plane V-V of FIG. 4.

With reference now to the specific examples of implementation, in various embodiments, as in the one illustrated, the sliding bars 14 and 16 are arranged on top of one another, supported at their opposite ends by one and the same pair of opposed plates 18 of the supporting structure 12. The bars 14 and 16 have respective central slide portions 14A, 16A having a substantially cylindrical shape, engaged by corresponding tubular portions 2A and 4A of the two carriages 2 and 4, via interposition of one or more bushings 22 (FIG. 5). The portions 2A and 4A are slidable along the bars 14 and 16, and rotatable around them. In various preferred embodiments, as in the one illustrated (see in this connection FIG. 5), the tubular portions 2A and 4A extend in length by a value that exceeds half the length of the slide portions 14A, 16A, and set between each tubular portion and the corresponding bar are the pair of bushings 22, set at the opposite ends of the tubular portion, and axially constrained to the aforesaid portion according to modalities of a known type. This configuration bestows a considerable strength on the system in regard to the bending and torsional stresses on the carriages.

On the top side of the tubular portion 4A of the carriage 4 the means for guiding the movement of the carriage 2 are provided. In various embodiments, as in the one illustrated, these means comprise a guide path 24, which extends in a direction parallel to the longitudinal direction of the bar 14, and is slidably engaged by a sliding block 26 obtained on the underside of the tubular portion of the carriage 2. In various preferred embodiments, as in the one illustrated (see in particular FIG. 6), the path 24 is defined by two opposed metal blocks 28, which are received in the space comprised between two parallel longitudinal flanges 24A, provided on the top side of the tubular portion 4A. The sliding block 26 is set between the two blocks 28 and is engaged, on the opposite sides, by the mutually facing walls of the aforesaid blocks. The walls in question determine the angular position of the carriage 2 around the bar 14, and moreover constitute the guide surfaces for the sliding block 26.

In various embodiments, as in the one illustrated, the blocks 28 are in turn engaged by threaded members carried by the flanges 24A, in order to adjust the distance thereof from the latter, in a direction substantially orthogonal to the bars 14 and 16. In various embodiments, as in the one illustrated, each flange 24A has one or more threaded holes, and the members in question comprise a corresponding number of screws 34 that traverse these holes, setting the corresponding block at a distance from the flange. By screwing and unscrewing the screws 34, it is possible to vary the position thereof, and hence adjust the distance of the block from the flange. The screws 34 are then blocked in position via nuts 36.

By varying the position of the blocks 28 and, consequently, the position of the block 26 on the carriage 2 in the direction F1, orthogonal to the walls of the blocks, it is possible to adjust the angular position of the carriage 2 around the sliding bar 14. On the other hand, adjustment of the blocks 28 also enables guarantee of a proper coupling of these with the sliding block 26.

As has been said previously, in various embodiments, as in the one illustrated, the supporting structure 12 has, instead, the means for guiding the carriage 4.

In particular, the structure 12 has a beam 32, which extends parallel to the bars 14 and 16, on one and the same side thereof, and is supported, at the opposite ends, by the opposed walls 18. Associated to the above beam are the further means for guiding movement of the carriage 4.

Figure 6:
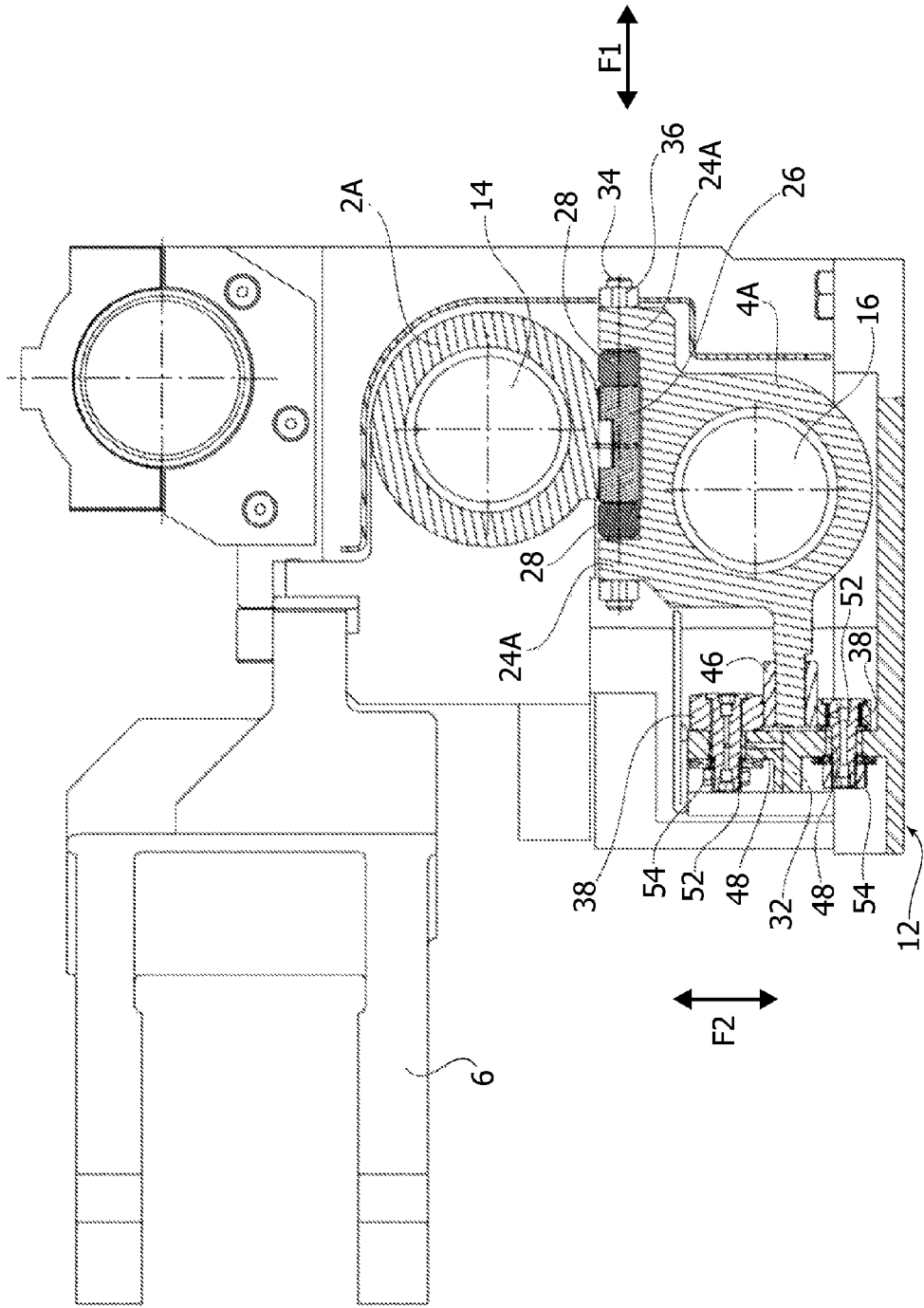
FIG. 6 is a partially sectioned side view of the system of FIG. 1.

In various preferred embodiments, the aforesaid means comprise a formation of opposed rollers 38, mounted in a freely rotatable way on the beam 32 around respective axes orthogonal to the direction of movement of the carriage 4 (see FIG. 6). The tubular portion 4A of the carriage 4 has a side flange projecting in cantilever fashion towards the beam 32, and bearing, at the end, a sliding portion 46. This is set between the rollers 38, which engage it on the opposite top and bottom faces, thus constraining the carriage 4 in a given angular position, and guiding it in this position during its movement.

In various embodiments, as in the one illustrated, the opposed rollers 38 are mounted on the beam 32 via connection means that enable adjustment of vertical position thereof. These means comprise, for each roller, an eccentric bushing 48 via which the pin 52 that carries each individual roller is mounted in a corresponding hole made in the beam 32. Variation of the orientation of the bushing 48 within the above hole causes a vertical displacement of the pin. A nut 54 engages the end of the pin opposite to the roller 38 so as to block in position the pin and the bushing 48 itself that is fixed with respect thereto.

The aforesaid adjustment enables variation of the vertical position of the sliding portion 46, in the direction F2, with respect to the supporting structure 12, and hence modification of the angular position of the carriage 4 around the bar 16, in the same way as what has been described above with reference to the guide means of the carriage 2.

In further embodiments (see in this connection FIG. 7), in addition, or as an alternative, to the adjustment of the individual rollers described herein, it is possible to envisage an adjustment of the vertical position of the entire formation of the rollers. The embodiments in question envisage a support 33 carrying the set of the rollers 38, which can be translated vertically with respect to the supporting structure 12 and adjusted in position via threaded adjustment means. In particular, the support 33 is guided at its two opposite edges within respective grooves 35, each made between the appendage of a wall 32' transverse to the walls 18 and set on the corresponding side of the edge of the support 33 and a respective plate 37 fixed to the wall 32 itself. The vertical position of the support 33 can be adjusted via a screw 41, which engages the support 33 and the plane of the structure 12 on which the walls 18 are mounted. The screw 41 and the support 33 are blocked in position via a nut 43.

As emerges from what has been said above, in the system described herein the carriages 2 and 4 are hence both adjustable in position, in a simple and fast way, by acting on the guide means described above. This facilitates, in the first place, the operations of installation of the carriages on the machine, and, moreover, enables recovery, in an equally simple and fast way, any possible misalignments due to wear of the mutually sliding parts, thus redefining the positions determined by the guide means.

The system in question moreover constitutes a support for carriages that is rigid, strong, and, at the same time of limited overall dimensions. In particular, the fact of providing a bar for each carriage guarantees high stiffness of the system, whilst the filet of providing on one of the two carriages the guide means of the other carriage enables limitation of its overall dimensions. Precisely for this reason, the system described herein is particularly advantageous in use for supporting blow moulds, around which, as is known, the space available is, in fact, considerably more limited as compared to the space available around the blank moulds.

Of course, without prejudice to the principle of the invention, the details of construction and the embodiments may vary, even significantly, with respect to what has been illustrated herein purely by way of non-limiting example, without thereby departing from the scope of the invention, as defined by the annexed claims.

The invention claimed is:

1. A mould-supporting system for a machine for forming hollow glassware, comprising:
   a supporting structure;
   a first carriage and a second carriage, which are slidably mounted respectively on a first bar and a second bar of said supporting structure, and carry, respectively, a first mould-carrier arm and a second mould-carrier arm; and
   means for controlling mutual displacement of said first and second carriages between a position where they are set close to one another and a corresponding position where they are set apart;
   said second carriage comprising means for guiding said first carriage during a mutual displacement of said first carriage and said second carriage.

2. The system according to claim 1, wherein said first carriage is rotatably mounted around said first bar and said means for guiding are configured for constraining said first carriage in a preset angular position.

3. The system according to claim 2, wherein said supporting structure further comprises second means for guiding said second carriage during the mutual displacement.

4. The system according to claim 2, wherein said guide means comprise a guide path on a top side of said second carriage, said guide path extending in a direction parallel to the direction of said first and second bars and is slidably engaged by a sliding portion of said first carriage.

5. The system according to claim 4, wherein said supporting structure further comprises second means for guiding said second carriage during the mutual displacement.

6. The system according to claim 4, wherein said guide path is defined by two opposed blocks received in a space between two parallel longitudinal flanges on said top side of said second carriage, said blocks engaged by threaded members carried by said flanges, said threaded members designed to separate said blocks from said flanges;
   wherein said sliding portion is set between said blocks and is engaged on opposite sides by mutually facing walls of said blocks.

7. The system according to claim 6, wherein said supporting structure further comprises second means for guiding said second carriage during the mutual displacement.

8. The system according to claim 6, wherein positions of said threaded members on said flanges are adjustable so as to adjust distances of said blocks from said flanges.

9. The system according to claim 8, wherein said supporting structure further comprises second means for guiding said second carriage during the mutual displacement.

10. The system according to claim 1, wherein said supporting structure further comprises second means for guiding said carriage during the mutual displacement.

11. The system according to claim 10, wherein said second carriage is rotatably mounted around said second bar and said second means for guiding are configured for constraining said second carriage in a preset angular position.

12. The system according to claim 11, wherein said second guide means comprise a formation of opposed rollers, said rollers rotatably mounted about horizontal axes on a wall of said supporting structure, the wall set parallel to said sliding bars, said rollers set on one side of said sliding bars, and wherein said second carriage has a side portion projecting in cantilever fashion defining a sliding portion, said sliding portion engaged, on opposite surfaces thereof, by said opposed rollers.

13. The system according to claim 12, wherein the positions of the rollers on said wall are adjustable in a vertical direction.

14. A mould-supporting system for a machine for forming hollow glassware, comprising:
    a supporting structure;
    a first carriage and a second carriage, which are slidably mounted respectively on a first bar and a second bar of said supporting structure, and carry, respectively, a first mould-carrier arm and a second mould-carrier arm; and
    said first carriage connected to a first shaft and said second carriage connected to a second shaft, said first shaft and said second shaft coupled to a crank mechanism for controlling mutual displacement of said first and second carriages between a position where they are set close to one another and a corresponding position where they are set apart;
    said second carriage comprising a guide path extending in a direction parallel to said first bar,
    said first carriage comprising a sliding block slidably engaging said guide path;
    said guide path defined by opposed blocks received in a space bounded by longitudinal flanges of said second carriage;
    said opposed blocks adjustable relative to said flanges via a plurality of adjusting members extending though said flanges to contact and hold said opposed blocks such that said opposed blocks guide said first carriage during a mutual displacement of said first carriage and said second carriage.

* * * * *